United States Patent [19]

Loren

[11] Patent Number: 4,743,057
[45] Date of Patent: May 10, 1988

[54] SPOILER CONSTRUCTION AND METHOD

[75] Inventor: Norman S. Loren, Warren, Mich.

[73] Assignee: Michael Ladney, Grosse Pointe Shores, Mich.

[21] Appl. No.: 48,048

[22] Filed: May 11, 1987

[51] Int. Cl.$^4$ .............................................. B62D 37/02
[52] U.S. Cl. ..................................................... 296/1 S
[58] Field of Search ........................................ 296/1 S

[56] References Cited

U.S. PATENT DOCUMENTS

| | | | |
|---|---|---|---|
| 3,810,286 | 5/1974 | Kaufman, Sr. ...................... | 296/1 S |
| 4,274,670 | 6/1981 | Pitzmann ............................. | 296/1 S |
| 4,323,274 | 4/1982 | Soderberg et al. .................. | 296/1 S |
| 4,339,145 | 7/1982 | Bott et al. ........................... | 296/1 S |
| 4,379,582 | 4/1983 | Miwa .................................. | 296/1 S |
| 4,417,760 | 11/1983 | Koch .................................. | 296/1 S |
| 4,533,168 | 8/1985 | Janssen et al. ..................... | 296/1 S |
| 4,558,898 | 12/1985 | Deaver ............................... | 296/1 S |

Primary Examiner—Robert R. Song
Attorney, Agent, or Firm—Brooks & Kushman

[57] ABSTRACT

A vehicle spoiler comprises a first rigid body part having an external surface contour, a second resiliently deformable foam body part having an external surface contour complementary to the first surface contour, and means for integrally securing the first and second body parts together. Preferably, the deformable foam body part is molded in situ on the rigid body part. A finishing groove extending between adjacent edges of the first external surface contour and the second external surface contour prevents recognition of differences between the materials and processes used to form the first and second body parts and prevents inconsistent transition between the body parts. A method for forming the spoiler includes fabrication of injection molded body shell parts bonded together by a foam material to form a rigid first body section. The rigid body section is then positioned within a molding cavity while foam material is introduced into the cavity and against engagement surfaces on the rigid body part.

16 Claims, 1 Drawing Sheet

SPOILER CONSTRUCTION AND METHOD

BACKGROUND OF THE INVENTION

I. Field of the Present Invention

The present invention relates generally to the construction of vehicle body panels, and more particularly to such body panels combining a rigid structural portion and a deformable foam structural portion.

II. Description of the Prior Art

Vehicle spoilers in the form of air foil type structures which are mounted on the exterior of a vehicle body to reduce drag and smooth the flow of air past the vehicle are known. While spoilers are often constructed of a rigid material so that they maintain their shape and position when subjected to the force of air currents, such spoilers are often secured to other body panels. As a result, it is desirable to minimize the weight of the spoiler structure in order to minimize the strength required in the body panels which support the spoiler and to reduce overall vehicle weight.

Moreover, vehicle spoilers may be positioned for maximum utility in an area of the vehicle where it is exposed to impacts with foreign objects. As a result, it has also been known to form spoilers from an elastic member made of foam material. For example, U.S. Pat. No. 4,323,274 to Soderberg discloses a support bracket embedded within a foam material forming a spoiler structure. While such a structure is deformable and thus prevents destruction of the spoiler when an object impacts against the spoiler, the foam material must be supported by adjacent rigid materials such as a support bracket or adjacent body panel portions in order to maintain a fixed dimensional shape and contour. Thus, as shown in U.S. Pat. No. 4,274,670 to Pitzmann, forward and trailing portions of the foam material are often resiliently engaged against the outer surface of the vehicle body portions to match the contours of the body panels. Moreover, the finished appearance of such materials often differs from the appearance of the adjacent body panels, and thus affects the ornamental appearance of the vehicle or the case of finishing the spoiler surface.

SUMMARY OF THE PRESENT INVENTION

The present invention overcomes the above-mentioned disadvantages by providing a spoiler constructed of a first rigid part and a second resiliently deformable body part wherein each of the first and second body parts includes an exterior surface contour complementary to the exterior contour of the other part. The body parts are secured together so that the exterior surface contours lie substantially adjacent each other and at least one of the parts includes at least one engagement surface integrally formed with the part for interconnecting the first and second body parts with the foam material.

In the preferred embodiment, the first rigid body part is constructed of injection molded shell portions which are bonded together. Preferably, the bonding between the shell portions comprises a foam filler material which adheres to the inner surfaces of the injection molded shell portions. However, regardless of whether the rigid part is formed by bonding injection molded parts, blow molding of a unitary shell or some other fabricating method, the rigid part is formed with an exterior surface contour which terminates at a transitional boundary.

A portion of the first body part adjacent the transitional boundary includes at least one engagement surface adapted to adhere to the other body part. The engagement surface can be in the form of a cavity formed within the rigid shell portions adapted to be filled with foam material used to form the second body part. Alternatively, an engagement surface can be formed on an extended portion of the first body part which extends beyond the transitional boundary and becomes embedded within the foam material of the second body part when the second body part has been formed. Preferably, a combination of these two types of engagement surfaces are employed for maximum strength and durability in the connection between the first body part and the second body part.

The second body part is formed by positioning a completed first body part so as to enclose an open end of a molding chamber with the transitional boundary of the first body part. Foam material is then molded in situ to include an exterior surface contour complementary to the exterior surface contour adjacent the transitional boundary of the first body part. Thus, any cavity formed in the first body part and communicating with the mold chamber becomes filled with the foam and forms an integral connection between the body parts. In addition, any extended portion of said first body part protruding beyond the transitional boundary becomes embedded within the foam material forming the second body part.

Moreover, while each of the body parts contributes an exterior surface contour to form the aerodynamic surface of a completed spoiler structure, a groove is formed between the exterior surface contour on the first body part and the exterior surface contour of the second body part at the transitional boundary so that the foam material remains spaced apart from the edge of the first exterior surface. In a preferred method of forming such a groove, a removable welting is placed adjacent to the edge of the exterior surface contour of the first body part at the transitional boundary to prevent migration of the foam upon the exterior surface contour of the first body part. Thus, the welting used in the process of the present invention prevents the difficulties inherent in the use of in-mold stand-ups which are intolerant to variances in the manufactured rigid parts being inserted into the molds for in-situ molding of the deformable part. As a result, inconsistency in the matching of the complementary exterior surface contour formed on the second body part and the first exterior surface contour is avoided. Furthermore, the groove provides a cosmetically appealing appearance although the rigid and deformable parts are substantially different production pieces.

Thus, the present invention provides a novel spoiler construction in which a rigid structural body is combined with a resiliently deformable foam body part in a manner which disguises the substantially different manufacturing techniques used to form the two parts. In addition, the formation of a groove at the transitional boundary eliminates trimming of the foam part after molding, and enhances the appearances of the completed spoiler. While the present invention is discussed particularly in terms of the construction of a vehicle spoiler, it will be understood that other vehicle body parts can also be formed in accordance with the teachings of the present invention. Nevertheless, the advantages of the present invention will be better understood upon review of the following detailed description of a preferred embodiment of the present invention.

BRIEF DESCRIPTION OF THE DRAWING

The present invention will be more clearly understood by reference to the following detailed description of a preferred embodiment when read in conjunction with the accompanying drawing in which like reference characters refer to like parts throughout the views and in which.

DETAILED DESCRIPTION OF A PREFERRED EMBODIMENT

Figure 1:
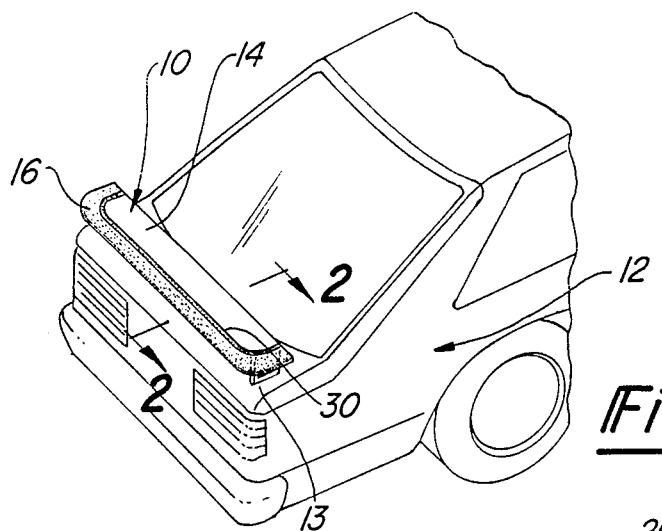
FIG. 1 is a perspective view of a vehicle including a spoiler constructed in accordance with the present invention.

Referring first to FIG. 1, a spoiler 10 constructed in accordance with the present invention is thereshown secured to a trailing portion of a vehicle body 12. In the position shown in FIG. 1, the spoiler 10 includes a rigid body portion 14 and a peripheral, deformable portion 16. The foam portion 16 may extend outwardly beyond the rear and side edges of the rigid body part 14 so that portions of the spoiler 10 exposed at an impact area are resiliently deformable in the event of an impact. In any event, the rigid body part 14 maintains its shape and secure attachment with the vehicle body 12.

Figure 2:
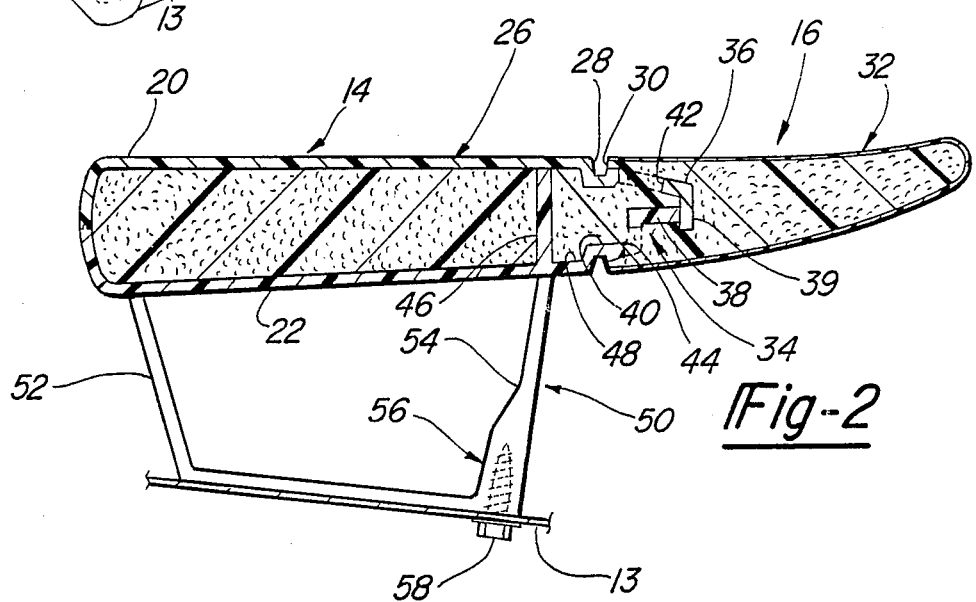
FIG. 2 is a sectional view taken substantially along the line 2—2 in FIG. 1.

As best shown in FIG. 2, the first rigid body part 14 comprises an upper, injection molded shell 20 and a lower, injection molded shell 22. The shells 20 and 22 form a hollow body defining a chamber 24. The chamber 24 can be filled with a foam material which adheres to the peripheral wall of the chamber 24 and thus bonds the shell section 20 to the shell section 22. The combined shell sections 20 and 22 form an aerodynamic, exterior surface contour 26.

The first exterior surface contour 26 terminates at a transitional boundary 28 which, in the preferred embodiment, permits the formation of a finishing groove 30 that extends between a peripheral surface contour 32 formed on a second body part 16 and the first exterior surface contour 26. The second body part 16 is wholly formed from a molded foam material. The foam material may be of a self-skinning type so as to provide a smooth finish surface for the exterior contour 32.

The connection between the first body part 14 and the second body part 16 is preferably formed by a combination of engagement surfaces formed on the first body part 14 and the second body part 16. In particular, an extended portion of said first body part 14 includes an extended wall portion 36 of the upper shell 20 and an extended wall portion 38 on the lower shell portion 22. Each of the extended wall portions 36 and 38 extend outwardly from the transitional boundary 28 at a position recessed from the first exterior surface contour 26 so as to become embedded within the foam material forming the second body part 16.

In addition, the extended walls 36 and 38 are spaced apart so as to define a chamber 40 within the first body part 14. Each of the extended walls 36 and 38 includes an aperture 42 and 44, respectively, which although optional, permit foam used in forming the second body part 16 to enter the chamber 40 during the molding process.

In the preferred embodiment, the chamber 40 is separated from the chamber 24 by a partition wall 46 formed on one of the upper and lower shell members 20 and 22. Thus, the foam used to fill each of these chambers can be of different density or have different characteristics as desired. Nevertheless, the partition is optional, for example, where a unitary blow molded rigid body part is used, the entire chamber of the rigid body part may become filled with foam material during formation of the deformable body part.

In any event, it will be understood that the body part 14 is interlocked with the body part 16. Mechanical interlocking occurs when a chamber within the rigid body part includes an enlarged and recessed chamber portion, such as the portion 48 of chamber 40 as shown to the left of the transitional border 28 in FIG. 2, so that a mechanical interlock between the body parts 14 and 16 is formed. Moreover, the peripheral walls defining the chamber 40, and the exterior of the extended walls 36 and 38 may also be treated with an adhesive bonding material in order to increase adhesion between the first and second body parts 14 and 16. Moreover, the foam material forming the second body part 16 may itself bond to the engagement surfaces of the rigid body part 14. Furthermore, mechanical interlocking between the parts 14 and 16 can be provided by the engagement surfaces correspondingly formed in the foam body part adjacent to portions of the rigid body part as exemplified by the foam material adjacent to the bottom tip 39 of extended wall portion 36 in FIG. 2.

A stanchion 50 is used to secure the spoiler 10 to the vehicle body 12. In the preferred embodiment, the stanchion arms 52 and 54 are integrally formed with the rigid body part 14 as shown in FIG. 2. As shown at 56 in FIG. 2, a boss connecting the lower ends of arms 52 and 54 includes an aperture adapted to threadedly engage a bolt 58 securing the stanchion 52 to the body panel 13 of the vehicle body 12. Of course, the means for securing the body part 14 to the vehicle can be varied as desired.

Figure 3:
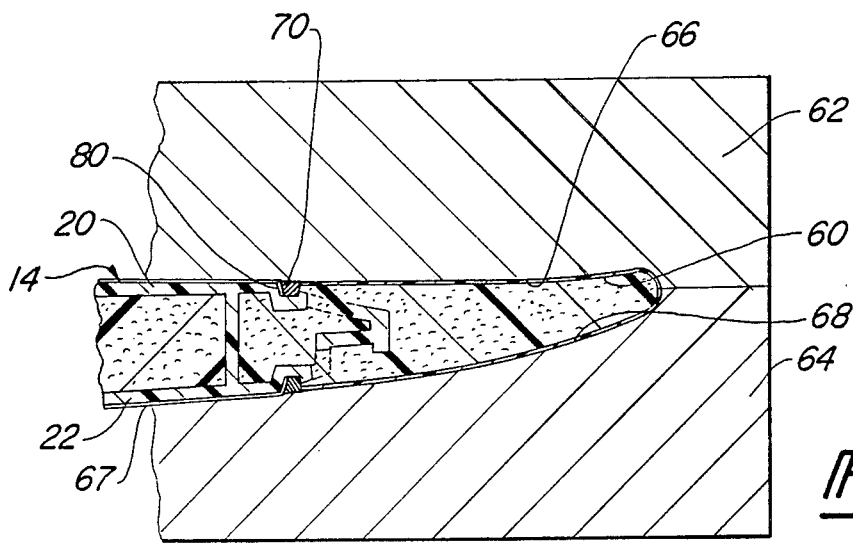
FIG. 3 is an enlarged broken sectional view demonstrating the molding of the second body part of the spoiler construction.

Referring now to FIG. 3, a method for forming the two-part vehicle body panel according to the present invention can be more easily described. As previously discussed, the rigid body part 14 can be fabricated in a number of ways. In the preferred embodiment, each of the shell portions 20 and 22 are injection molded and bonded together by filling the chamber 24 with a foam material. Of course, the peripheral walls defining the chamber 24 can be pretreated with an adhesion promoter before admitting the foam to the chamber 24 so that a tight adhesive bond between the foam and the rigid panel portions 20 and 22 forms a rigid body part 14. The body part 14 is then supported by an appropriate support to enclose a portion of a molding chamber 60 defined between mold parts 62 and 64 shown in FIG. 3. The part 14 is positioned so that the transitional boundary 28 faces toward the opposite end of the molding chamber 60.

An advantageous step in the process of the present invention includes the insertion of a removable welting 70 adjacent the transitional boundary 28 of the rigid part 14. The welting 70 provides a mold barrier which separates the foam material introduced into the molding chamber 60 from the rigid material of the first part 14 at the exterior surface contour 26 and thus provides the trim groove 30 at the transitional boundary 28.

The welting is in the form of a flexible strand of rubber or the like having a fixed width which determines the width of the groove. The welting material is preferably compressible so as to tolerate irregularities in the rigid body part but provides a smooth regular surface against which the foam material can form a trim edge adjacent the transitional boundary 28.

At least one of the surfaces of the strand engaging the rigid body part 14 can be adhesively secured to the body part surfaces by an adhesive coating 80 applied to the strip and exposed by removal of a backing sheet applied on the strip. Moreover, the other surfaces may be treated with a release agent or skin treatment which enables it to release easily from the foam material which cures against it. A strip may be cut to length for each body part to which it is applied, or the compressibility of the strip may also be utilized for stretching or shortening a pre-cut strip so as to make it reusable with a number of rigid parts despite variations in the manufacturing tolerance between like parts.

Such a welting 70 eliminates the in-mold stand-ups which mate or seal tightly against only accurately formed parts and which do not tolerate variances which occur as a practical matter in the production of formed parts. Nevertheless, it prevents foam migration toward the finished surface on the rigid body part. Moreover, the groove remaining once the strip has been removed provides a finished appearance which disguise any indications of the different manufacturing processes used to form the two body parts and eliminates trimming of the molded foam part at the transition boundary 28.

Once the welting 70 is positioned and the rigid part 14 is aligned and supported with the mold cavity, foam material can be introduced into the molding chamber 60 formed by mold parts 62 and 64 and enclosed by the first part 14. Preferably, the foam material is of the self-skinning type so as to provide a smooth surface for finishing such as painting or the like. Moreover, while the introduction of foam material to the molding chamber 60 forms a second body part 16 having an external surface contour 32 which is complementary to the external surface contour 26 of the rigid part 14, the molding step also provides a firm interconnection between the first part 14 and the second part 16 as previously discussed.

In the preferred embodiment, the foam material fills the chamber 40 including expanded portion 48 and provides a mechanical bond between the rigid part 14 and the foam part 16 in addition to the adhesive bond between the foam material and the peripheral walls of the chamber 40. As previously discussed, adhesion of the foam to the engagement surfaces of the first body part can be enhanced as desired or as required by the composition of the foam material by pretreating those surfaces with adhesion promoting material. Furthermore, the extended portion 34 of the rigid part 14 becomes embedded within the part 16 being formed. As a result, the in situ molding operation eliminates post-molding assembly operations.

Moreover, ornamental finishing of the spoiler can be easily accomplished even though the two parts are made of different materials. For example, once the injection molded upper and lower shells 20 and 22 are foam bonded together, the external surface contour 26 can be cleaned, primed, painted with a desired body color and finished with appropriate clear coating or the like. Then the rigid part 14 is enclosed within a protective wrap 67 to prevent destruction of the finish when the part is introduced into the mold chamber 60. Of course, the extended portion 34 of the rigid part 14 can remain exposed, and can be treated with a coating of an adhesion promoter for the foam material if necessary. In addition, the mold surfaces 66 and 68 within the mold parts 62 and 64, respectively, can be provided with a paint or other finish coating prior to introduction of the foam. The protectively wrapped panel is then positioned to enclose the molding chamber 60 so that subsequent introduction of the foam material into the molding cavity thus produces a finished, resiliently deformable body part having an external surface contour complementary to the external surface contour of the first body part.

In addition, the spoiler construction of the present application accommodate cosmetic variation between the rigid and deformable spoiler parts, and cosmetic disguise of the signs of the different manufacturing operations used to produce each of the parts. For example, the rigid part may be finished to match the various colors of the vehicle body, whereas the deformable portion may be consistently colored black or some other neutral color as an appearance accent. Alternatively, the colors of these parts may be matched. In addition, the spacing between the rigid and deformable parts prevents unsightly overruns of the foam material upon the external surface of the rigid body part.

Moreover, the preferred process for forming the groove between the body parts compensates for and tolerates variations due to dimensional tolerances which occur in the fabrication of the rigid body parts. For example, the transverse width of the rigid body part i.e. the distance along a transverse dimension of the vehicle, could vary within the part or between several parts made during a production run. For example, a part nominally 50 inches long could vary by up to 1/16 of an inch. As a result, it would be inappropriate to rigidly secure a stand-up or other partition within the mold cavity used to form a second body part since such a mold structure would not tolerate such dimensional differences. In particular, such partitioning of the mold cavity may cause inconsistent variations in the width of the groove being formed between the rigid and deformable body parts. Moreover, such stand-ups may not seal closely against the transitional boundary 28 of the first rigid part so as to prevent leakage of the foam over the finished surface of the rigid body part.

On the other hand, the process of forming the deformable part including insertion of a removable welting in the form of a flexible, compressible strand between the rigid body part and the mold cavity wall at the transitional boundary forms a tight seal between the rigid body part and the mold cavity walls at the transitional boundary 28. As a result, the welting 70 prevents overrunning of the foam material against portions of the rigid part regardless of dimensional tolerances permitted during the formation of the rigid body part. In addition, the welting permits the mold cavity to be adapted for the formation of molded parts on numerous rigid body parts despite slight variations in the dimensions of the rigid body part without requiring modification of the mold or impractical or extreme tolerance guidelines for the manufacturing of the rigid body parts.

Thus, the present invention provides a spoiler construction including a rigid portion which assures proper positioning and support for a spoiler with respect to a vehicle body, and a deformable body section exposed to the impact area about the vehicle. Thus, inadvertent contact or collision with the spoiler 10 does not result in destruction or displacement of the spoiler with respect to the body structure. Rather, the deformable part of the spoiler resiliently absorbs a substantial amount of the force exerted upon the spoiler, and then returns to its normal shape after the contacting object has been removed. Moreover, despite the fact that the spoiler 10 is made in two separate pieces of substantially different materials, the pieces are integrally formed so as to provide complementary aerodynamic surface configurations in a manner which disguises any difference between the materials used to form the parts and provide a unitary ornamental appearance.

Having thus described the structure and method of the present invention, many modifications thereto will become apparent to those skilled in the art to which it pertains without departing from the scope and spirit of the present invention as defined in the appended claims.

What is claimed is:

1. An air spoiler panel of a vehicle comprising:
   a first rigid body part having a first exterior surface contour;
   a second resiliently deformable body part having a second exterior surface contour complementary to said first exterior surface contour;
   means for securing said first body part to said second body part so that said first exterior surface contour lies substantially adjacent said second exterior surface contour, said means including at least one engagement surface integrally formed on at least one of said first and second body parts.

2. The invention as defined in claim 1 wherein said at least one engagement surface is integrally formed on said first body part and wherein said second body part is molded in situ in engagement with said at least on engagement surface.

3. The invention as defined in claim 2 wherein said first rigid part includes a hollow chamber and wherein said at least one engagement surface includes a peripheral surface of said hollow chamber in said first body part, and
   further wherein an extended portion of said second body part is molded in situ within said chamber.

4. The invention as defined in claim 3 wherein said extended portion of said second body part is adhesively bonded to said at least one engagement surface.

5. The invention as defined in claim 1 wherein said at least one engagement surface comprises an extended portion of said first body part embedded in said second body part.

6. The invention as defined in claim 3 wherein said peripheral surface is a first of said at least one engagement surface, and wherein said at least one engagement surface further comprises a second engagement surface, said second engagement surface being an extended portion of said first body part embedded in said second body part.

7. The invention as defined in claim 2 wherein said second part is made of a self-skinning plastic foam material.

8. The invention as defined in claim 2 wherein each of said first and second exterior surface contours includes a transitional boundary, and wherein said transitional boundary of said first exterior surface contour is spaced apart from and faces toward said transitional boundary of said second exterior surface contour.

9. The invention as defined in claim 1 wherein said first body part comprises first and second shell sections and means for securing said shell portions together.

10. The invention as defined in claim 9 wherein each said shell section is injection molded plastic.

11. The invention as defined in claim 9 wherein at least a portion of said first body part is hollow and wherein said first and second sections are adhesively bonded by a plastic foam material filling said hollow body portion.

12. The invention as defined in claim 1 wherein said body panel comprises a vehicle spoiler and wherein said first exterior surface contour is an aerodynamic leading surface and said second exterior surface contour is an aerodynamic trailing surface.

13. The invention as defined in claim 12 and further comprising mounting means for supporting said first body part with respect to a vehicle body.

14. An air spoiler panel of a vehicle comprising:
    a rigid body part having a first exterior surface contour terminating at a transitional boundary; and
    a resiliently deformable body part with a second surface contour complementary to said first exterior contour;
    wherein said first and second surface contours are separated by a trim groove formed by positioning a removable welting at said transitional boundary prior to molding a foam material in situ on said rigid body part.

15. The invention as defined in claim 14 wherein said welting comprises a flexible strand having a predetermined width.

16. The invention as defined in claim 14 wherein said welting includes an adhesive coating for securing said welting to said rigid body part.

* * * * *

UNITED STATES PATENT AND TRADEMARK OFFICE
CERTIFICATE OF CORRECTION

PATENT NO. : 4,743,057
DATED : May 10, 1988
INVENTOR(S) : Norman S. Loren

It is certified that error appears in the above-identified patent and that said Letters Patent is hereby corrected as shown below:

In The Specification:

Column 1, line 43  "case" should be --ease--.

In The Claims:

Column 7, line 36, claim 2  "on" should be --one--.

Signed and Sealed this

Fifteenth Day of November, 1988

Attest:

DONALD J. QUIGG

Attesting Officer

Commissioner of Patents and Trademarks